(12) United States Patent
Vauchel et al.

(10) Patent No.: US 8,640,825 B2
(45) Date of Patent: Feb. 4, 2014

(54) ACOUSTIC PANEL FOR AN EJECTOR NOZZLE

(75) Inventors: Guy Bernard Vauchel, Le Harve (FR); Emmanuel Drevon, Anglesqueville l'esneval (FR); Patrick Gonidec, Bretx (FR); Guillaume Ruckert, Fiquefleur-equainville (FR); Eric Conete, Merignac (FR); Renaud Barreteau, Merigna (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/000,720

(22) PCT Filed: May 14, 2009

(86) PCT No.: PCT/FR2009/050900
§ 371 (c)(1),
(2), (4) Date: Dec. 22, 2010

(87) PCT Pub. No.: WO2010/007263
PCT Pub. Date: Jan. 21, 2010

(65) Prior Publication Data
US 2011/0108357 A1    May 12, 2011

(30) Foreign Application Priority Data
Jun. 25, 2008 (FR) ...................................... 08 03559

(51) Int. Cl.
*E04B 1/84* (2006.01)
(52) U.S. Cl.
USPC .......................................... 181/292; 181/222
(58) Field of Classification Search
USPC ............................................... 181/222, 292
See application file for complete search history.

(56) References Cited

U.S. PATENT DOCUMENTS

| 3,630,312 | A | * | 12/1971 | Woodward et al. | 181/292 |
| 3,977,146 | A | * | 8/1976 | Wiley | 52/787.1 |
| 4,465,725 | A | | 8/1984 | Riel | |
| 5,594,216 | A | | 1/1997 | Yasukawa | |
| 6,439,340 | B1 | * | 8/2002 | Shirvan | 181/213 |

(Continued)

FOREIGN PATENT DOCUMENTS

| EP | 0895223 A2 | 2/1999 |
| EP | 0897174 A1 | 2/1999 |

(Continued)

OTHER PUBLICATIONS

International Search Report PCT/FR2009/050900; Dated Dec. 22, 2009.

*Primary Examiner* — Jeremy Luks
(74) *Attorney, Agent, or Firm* — Brinks Gilson & Lione

(57) ABSTRACT

The invention relates to an acoustic panel (20) for an ejector nozzle (10) comprising the following main components: an external skin (22) containing acoustic holes (29); an internal skin (23); an acoustic structure (21) comprising alveolar-core cells (27) between the internal skin (23) and the external skin (22). At least one main component selected from the external skin (22), the internal skin (23) and the acoustic structure (21) is formed by a composite material and the acoustic structure (21) is held in contact with either or both of the internal (23) and external (22) skins by compression by elastic means and/or by fixing by mechanical fixing means (24). The invention also relates to an injector nozzle (10) and a nacelle (1) comprising such an acoustic panel (20).

17 Claims, 3 Drawing Sheets

(56) References Cited

U.S. PATENT DOCUMENTS

| | | | |
|---|---|---|---|
| 6,827,180 B2 * | 12/2004 | Wilson | 181/292 |
| 6,857,669 B2 * | 2/2005 | Porte et al. | 285/368 |
| 6,868,940 B1 * | 3/2005 | Mekwinski | 181/290 |
| 2001/0048048 A1 | 12/2001 | Riedel | |
| 2004/0154861 A1 * | 8/2004 | Pompei | 181/290 |
| 2006/0162998 A1 * | 7/2006 | Hawkins et al. | 181/293 |

FOREIGN PATENT DOCUMENTS

| | | |
|---|---|---|
| EP | 1111584 A1 | 6/2001 |
| EP | 1213703 A1 | 6/2002 |
| EP | 1217605 A1 | 6/2002 |

\* cited by examiner

ACOUSTIC PANEL FOR AN EJECTOR NOZZLE

TECHNICAL FIELD

The present invention relates to an acoustic panel for an ejection nozzle.

The present invention also relates to an ejection nozzle and a nacelle comprising such a panel.

BRIEF DISCUSSION OF RELATED ART

An airplane is propelled by one or several propulsion assemblies each comprising a turbojet engine housed in a tubular nacelle. Each propulsion assembly is attached to an aircraft by a pylon situated under a wing or at the fuselage.

A nacelle generally has a structure comprising an air inlet upstream of the engine and a middle section able to surrounding a fan of the turbojet engine, a downstream section generally housing thrust reverser means and able to surround the combustion chamber of the turbojet engine. The nacelle typically ends with an ejection nozzle, the outlet of which is situated downstream of the turbojet engine.

The ejection nozzle is usually formed by an external module, also called common nozzle or primary nozzle, and an internal module, also called ejection cone or central backbody.

For noise reduction reasons, the facing surfaces of these two modules comprises acoustic panels able to trap any noise. These panels usually include one or several layers of an alveolar-core structure (commonly called "honeycomb" structure). These layers are coated on their lower face, i.e. not in contact with the air flow inside the nacelle, with a skin impermeable by air, called "solid", and on their upper face, i.e. in contact with the air stream inside the nacelle, with a perforated external skin permeable by air, called "acoustic."

Nevertheless, at the exhaust outlet, the hot gases coming from the turbojet engine typically have a high temperature of at least around 500° C.

It is known to produce these modules in materials bearing such temperatures, such as titanium, steel, or a super alloy of the Inconel® type. To do so, the various elements of the acoustic panel are assembled by welding or soldering.

However, titanium is a costly material. Moreover, it does not make it possible to produce acoustic parts, in particular acoustic structures, without the flaw of these squeezing on the internal and external skins. Indeed, due to the production set of the internal skin, of the external skin and of the acoustic structure, local unsticking phenomena occur.

The super alloy of the Inconel® type has a high density, which has a negative impact on the mass of the propulsion portion of the aircraft.

BRIEF SUMMARY

One aim of the present invention is therefore to provide an acoustic panel for an ejection nozzle having a lower mass, easy to produce without an unsticking phenomenon or local separation.

To that end, the present invention concerns an acoustic panel for an ejection nozzle comprising the following main components:
    an external skin containing acoustic holes,
    an internal skin,
    an acoustic structure comprising alveolar-core cells between the internal skin and the external skin, wherein at least one main component selected from the external skin, the internal skin and the acoustic structure is formed by a high-temperature composite material and the acoustic structure is held in contact on at least one of the internal and external skins by compression using elastic means and/or by fastening using mechanical, in particular localized, fastening means.

The acoustic structure is in contact with one of the skins either by flexible connection through compression or by a rigid connection. The main components have the advantage of adjusting amongst themselves so as to allow complete connection coherence. Because of this, during its use, the panel according to the invention does not have a separation zone.

Advantageously, the acoustic panel according to the present invention makes it possible to facilitate the mounting of the acoustic structure between the internal and external skins, which ensures good industrial feasibility.

Moreover, the acoustic panel of the invention makes it possible to use different materials, such as metals, alloys and composites, having specific expansion coefficients without the structural resistance of said panel being made weak.

According to other features of the invention, the panel of the invention includes one or several of the following optional features considered alone or according to all possible combinations:
    at least one part of the elastic means includes at least one fibrous assembly topping the acoustic structure and able to compress in thickness, which makes it possible to avoid plugging up the acoustic holes of the external skin;
    the fibrous assembly is formed by a material chosen among high-temperature graphite and carbon felts integrating, as needed by those skilled in the art, at least: the porosity of the felt, the tortuosity of the fibers, the aspect ratio, the average size of the fibers, the entanglement rate, etc., which makes it possible to obtain good elasticity in the thickness of the fibrous assembly;
    at least a part of the elastic means comprises dampers extending the wall of at least one part of the alveolar-core cells of the acoustic structure, which makes it possible to guarantee contact between the acoustic structure and at least one of the internal and external skins;
    the dampers are in the form of curved tongues;
    at least one damper is attached on the wall, which makes it possible to use materials of different natures;
    at least one damper and the wall are formed in a single piece, which makes it possible to produce the elastic means from the production of the acoustic panel of the invention;
    the elastic means comprises a spiral spring able to exert pressure against the acoustic structure so as to put said structure and the external skin in contact;
    at least one part of the mechanical means is able to fasten the acoustic structure on at least one of the internal and external skins, which makes it possible to ensure good fastening of the acoustic structure on at least one of the internal and external skins;
    the mechanical fastening means comprise rivets fastening a plurality of closed alveolar-core cells to one end and one of the internal and external skins;
    at least a part of the mechanical fastening means connects the spacer of the internal and external skins;
    a part of the mechanical fastening means comprises glue or solder deposits applied between the acoustic structure and at least one of the internal and external skins;

the acoustic panel has a set between the acoustic structure and one of the internal and external skins that makes it possible to ensure the draining of the acoustic panel of the invention;

the composite material bears a temperature at least equal to about 500° C.;

the composite material is a ceramic matrix composite material.

According to a second aspect, the present invention concerns an ejection nozzle for a nacelle comprising an acoustic panel according to the invention.

According to a second aspect, the present invention concerns a nacelle comprising an ejection nozzle according to the invention.

BRIEF DESCRIPTION OF THE DRAWINGS

The invention will be better understood upon reading the following non-limiting description, done in reference to the appended figures.

DETAILED DESCRIPTION

Figure 1:
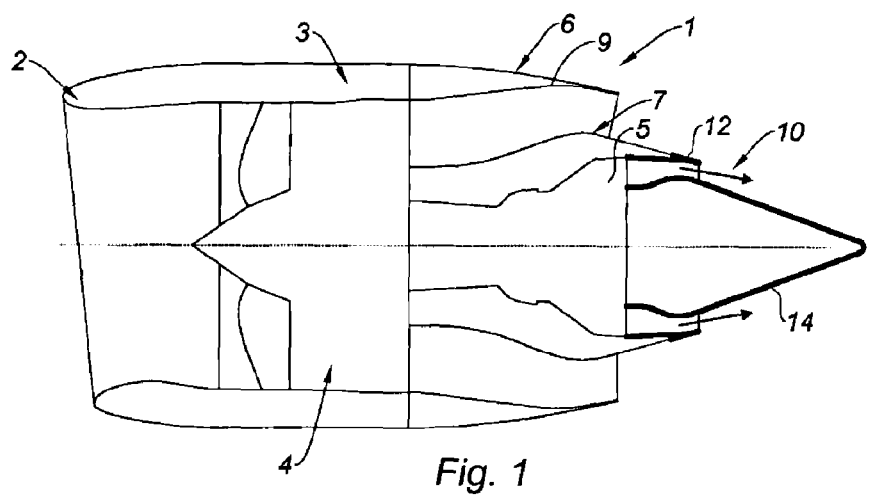
FIG. 1 is a transverse cross-section of a nacelle according to the invention.

As shown in FIG. 1, a nacelle 1 according to the invention comprises an air intake lip 2, a middle structure 3 surrounding a fan 4 of a turbojet engine 5 and a downstream assembly 6. The downstream assembly 6 is formed by a inner fixed structure 7 (IFS) surrounding the upstream portion of the turbojet engine 5, an outer fixed structure (OFS) (not shown) and a moving cowl 9 including thrust reverser means. A suspension pylon (not shown) supports the turbojet engine 5 and the nacelle 1 of the invention.

The nacelle 1 of the invention ends with an ejection nozzle 10 comprising an external module 12 and an internal module 14. The internal 14 and external 12 modules define a flow channel for a primary so-called hot air stream exiting the turbojet engine 5.

The internal 14 and external 12 modules comprise an acoustic panel comprising the following main components:
an external skin containing acoustic holes,
an internal skin,
an acoustic structure comprising alveolar-core cells between the internal skin and the external skin.

The internal skin is substantially solid and not in contact with the primary hot air stream.

The external skin in contact with the hot air stream is perforated with multiple holes positioned according to an arrangement defined as a function of the desired acoustic attenuation. Without being limited thereto, the holes will typically have a diameter between 0.2 and 3 mm, preferably between 0.8 and 1.6 mm.

At least one main component of the panel of the invention is formed by a composite material. More specifically, the internal skin, the external skin and/or the acoustic structure are made from composite materials.

In the case where a main component is not formed from a composite material, it can be formed from a metal material such as titanium or inconel.

According to one preferred embodiment, the composite material bears a temperature at least equal to about 500° C., or even more. The composite material is advantageously a ceramic matrix composite material.

The acoustic structure is held in contact on at least one of the internal and external skins by compression using elastic means and/or by fastening using mechanical, in particular localized, fastening means. It is therefore possible to combine, in a same panel according to the invention, the use of elastic means and mechanical, in particular localized, fastening means, in order to ensure maximal structural coherence.

Figure 2:
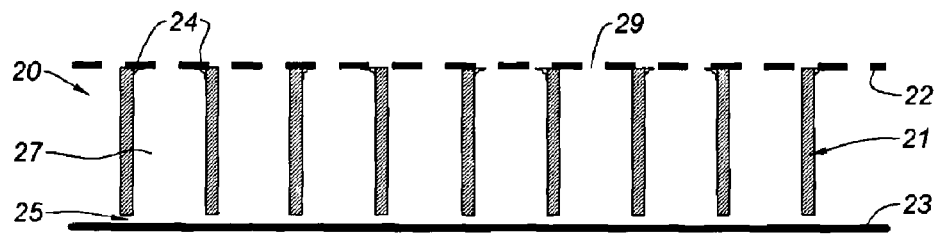
FIG. 2 is a transverse cross-section of an embodiment of the panel according to the invention.

According to the embodiment shown in FIG. 2, the acoustic panel 20 has an acoustic structure 21 in contact with one of the external 22 and internal 23 acoustic skins, in particular by deposition 24 of glue or solder. The glue or solder used may be any type of glue or solder known by those skilled in the art for this type of hot structure.

Interestingly, the acoustic structure 21 is glued or soldered on the external skin 22. It is also possible to glue or solder the acoustic structure 21 on the internal skin 23 in order to avoid any obstruction of acoustic holes 29. More generally, the gluing or soldering is done so as not to close the acoustic holes 29 in order to prevent any limitation of the acoustic absorption.

It is possible to use main components (internal skin 23, external skin 22 and acoustic structure 21) of different natures. For example, the acoustic structure 21 may be made of a metal material of the titanium or inconel type, and the internal 23 and external 22 skins of a composite material, of the ceramic matrix type.

A space or set 25 can be left between one end of the alveolar-core cells 27 and the internal skin 23 or the external skin 22. One of the external 22 and internal 23 skins not in contact with the acoustic structure 21 is advantageously integrally stiffened using any means known by those skilled in the art in order to prevent the transit of deformation stress of the structure by said skin over the rest of the panel according to the invention 20.

The set 25 is defined so as not to disrupt the desired acoustic performance. Without being limited thereto, the set 25 can typically be between 0 and 5 mm, preferably 0 and 1.5 mm.

The set 25 also advantageously makes it possible to ensure the draining of the acoustic panel 20 of the invention. Indeed, in a traditional acoustic sandwich structure, the presence of holes on the surface in contact with the external elements allows water or other liquids to penetrate the recesses of the lower zone of the sandwich structure. To avoid any accumulation, notches are made in the honeycomb structure of the solid skin side (opposite the acoustic skin). All of the cells being perforated, the liquid winds from one cell to the next by gravity to a lowest point of the structure where a discharge hole is formed. In case of accumulation of a flammable liquid, there may be a high risk of fire. In the case of water accumulation, there is a risk of damage to the structure in case of freeze and moreover the plugged cells no longer perform their acoustic function.

Figure 3:
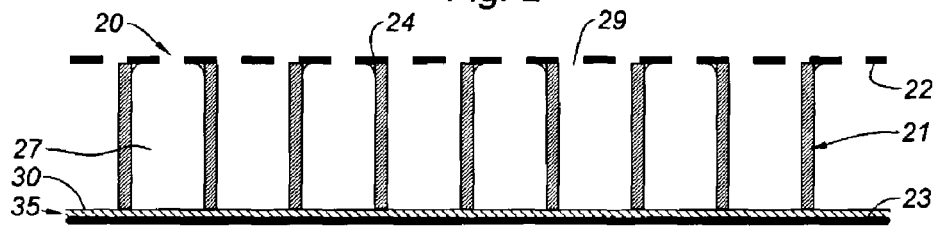
FIGS. 3 to 9 are alternative embodiments of FIG. 2.

According to an alternative shown in FIG. 3, the set 35 is filled by a fibrous assembly 30 including intermingled fibers, such as a felt. Thus, advantageously, the alveolar-core cells 27 are better sealed to meet the desired acoustic performance.

According to another preferred embodiment, at least part of the mechanical means is able to fasten the acoustic structure on at least one of the external and internal skins, which makes it possible to ensure good fastening of the acoustic structure and also good coherence of the acoustic panel of the invention. Advantageously, very good adhesion quality of the panel of the invention is obtained without having to perform localized touch ups to avoid any detachment. Savings therefore result relative to the materials used to perform such touch-ups.

Figure 4:
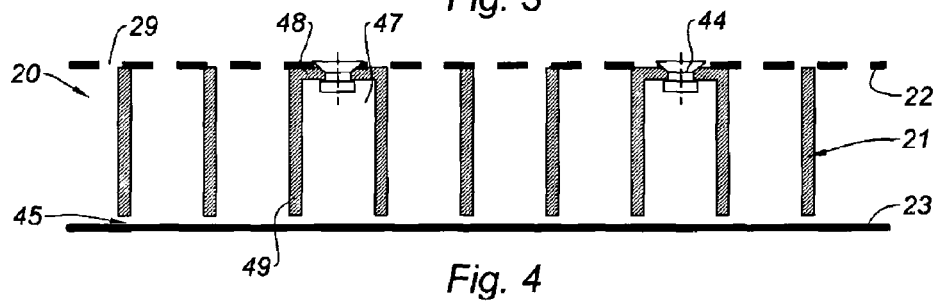

According to one embodiment shown in FIG. 4, the mechanical fastening means comprise rivets 44 fastening one of the skins, in particular the external skin 22, and a plurality of alveolar-core cells 47 that are closed at one end 48.

When the acoustic structure 21 is fastened on the internal skin 23, advantageously any obstruction of the acoustic holes 29 is avoided.

The density of the alveolar cells 47 is chosen by the person skilled in the art as a function of the desired acoustic performance.

As before, play 45 is left between the acoustic structure 21 and the internal skin 23 on which there is no contact.

In this case, it is advantageous to introduce, into the set 45, a fibrous assembly including intermingled fibers, such as a felt.

The bottom 48 of the alveolar-core cells can be integrated into the cell 47, in other words made integral with the wall of said cells 47, or come from an element attached on the acoustic structure 21. As an example, it is possible to attach glued, welded or hooked bottoms. In the latter case, the end of the wall 49 opposite the bottom 48 of the acoustic structure may advantageously be lowered to avoid any excess thickness due to the presence of the hooks.

It is also possible to use an acoustic structure including alveolar-core cells closed at both ends.

Depending on the rivet density 44, the external 22 and internal 23 skins can be securely fixed to each other by the acoustic structure 21 riveted on one side or the other. In the latter case, the external 22 and internal 23 skins may advantageously not join together beyond the panel 20 of the invention. Indeed, the connection between the external 22 and internal 23 skins is ensured by the acoustic structure 21 without risk of differential heat expansion.

Figure 5:
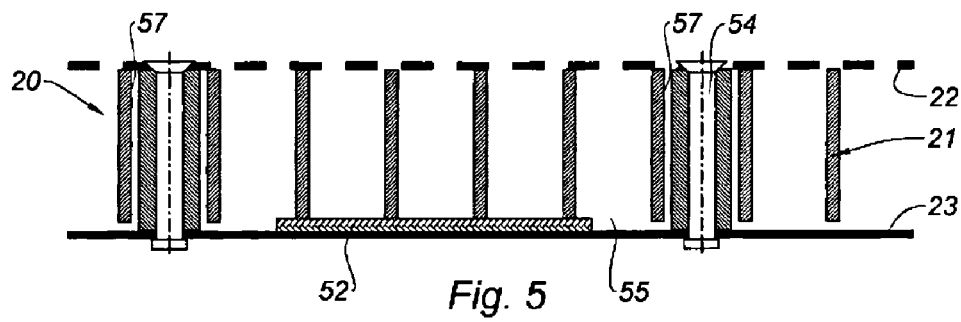

According to the embodiment shown in FIG. 5, at least part of the mechanical fastening means 54 connects the spacer of the external 22 and internal 23 skins. The mechanical fastening means 54 can also connect the external 22 and internal 23 skins by going through a plurality of alveolar-core cells 57.

Examples of mechanical fastening means 54 include rivets or bolts.

Such an embodiment makes it possible to achieve effective fastening without affecting the thickness of the acoustic structure 21.

The acoustic structure 21 may also be glued or in simple contact on either external skin 22.

It is also possible for the acoustic structure 21 to be topped by one or even two fibrous assemblies 52. Indeed, it is possible to choose the mechanical fastening means 54 so as to leave, on one or each side, a set 55 between the acoustic structure 21 and the skins 22 and 23.

Preferably, the mechanical fastening means 52 are made from the same material as the acoustic structure 21. Because of this, continuity of the heat expansions is ensured in the acoustic panel 20 of the invention.

According to the preferred embodiment, at least a part of the elastic means include at least one fibrous assembly topping the acoustic structure able to compress in thickness. The fibrous assembly has the advantage of not obstructing the acoustic holes of the external skin.

Figure 6:
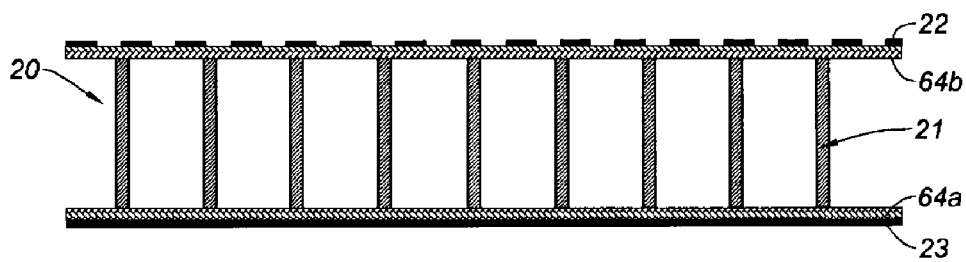

According to the embodiment illustrated in FIG. 6, two fibrous assemblies 64a and 64b surround the acoustic structure 21.

The acoustic structure 21 is positioned in simple contact against the skins 22 and 23 by pressure of the fibrous assembly 64a and 64b that comprises good elasticity in thickness. Because of this, the acoustic holes 29 are not completely obstructed by the material.

The fibrous assembly 64a and 64b in particular includes intermingled fibers. One example of this is an elastic felt.

The fibrous assembly 64a and 64b is preferably formed by a material selected from high-temperature graphite and carbon felts integrating, as needed by those skilled in the art, at least: the porosity of the felt, the tortuosity of the fibers, the aspect ratio, the average size of the fibers, the entanglement rate, which makes it possible to obtain good elasticity in the thickness of said assembly 64a and 64b.

Typically, the thickness of the felt is compatible with the set 25 and the desired compression value.

According to one alternative not shown, it is possible to use an acoustic structure 21 in which the walls of the alveolar-core cells opposite at least one external 22 and internal 23 skin include serrations in order to improve the anchoring of the acoustic structure 21 on the fibrous assembly 64a and 64b.

According to still another preferred embodiment, at least a part of the acoustic means comprising dampers extending the wall of at least a part of the alveolar-core cells of the acoustic structure, which makes it possible to guarantee contact between the acoustic structure and at least one of the internal and external skins. The dampers have an elasticity with a low amplitude that ensures the contact of the acoustic structure under a slight stress at the interface of the alveolar-core cells and the internal and external skins. The dampers are preferably in the form of curved tongues.

The number, shape and arrangement of said elastic means are adapted by those skilled in the art.

Figure 7:
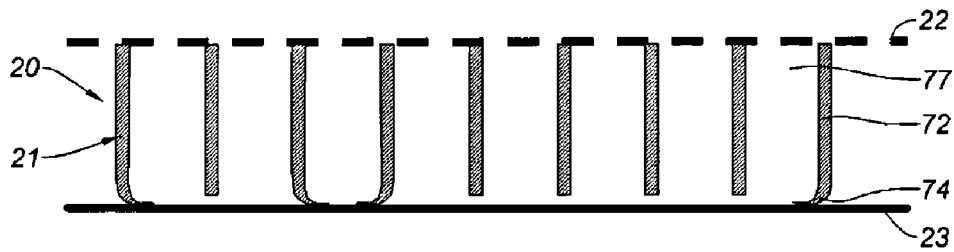

According to a first embodiment shown in FIG. 7, the dampers 74 extend the wall 72 of at least a part of the alveolar-core cells 77, i.e. the wall 72 and the dampers 74 are formed in a single piece, which makes it possible to produce the elastic means as of the production of the acoustic structure 21.

Figure 8:
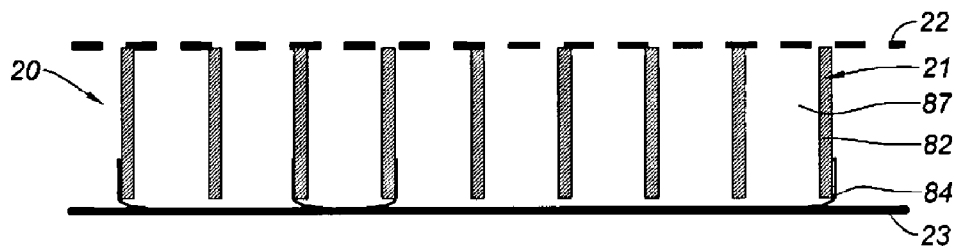

According to one alternative shown in FIG. 8, the dampers 84 are attached on the wall 82 of a plurality of alveolar-core cells 87, which makes it possible to use materials of a different nature to produce the acoustic structure 21 and the dampers 84. Thus, it is possible to consider using a metal acoustic structure 21, and internal 23 and external 22 skins in a ceramic material.

As an example, the elastic means 84 used are made of inconel.

Figure 9:
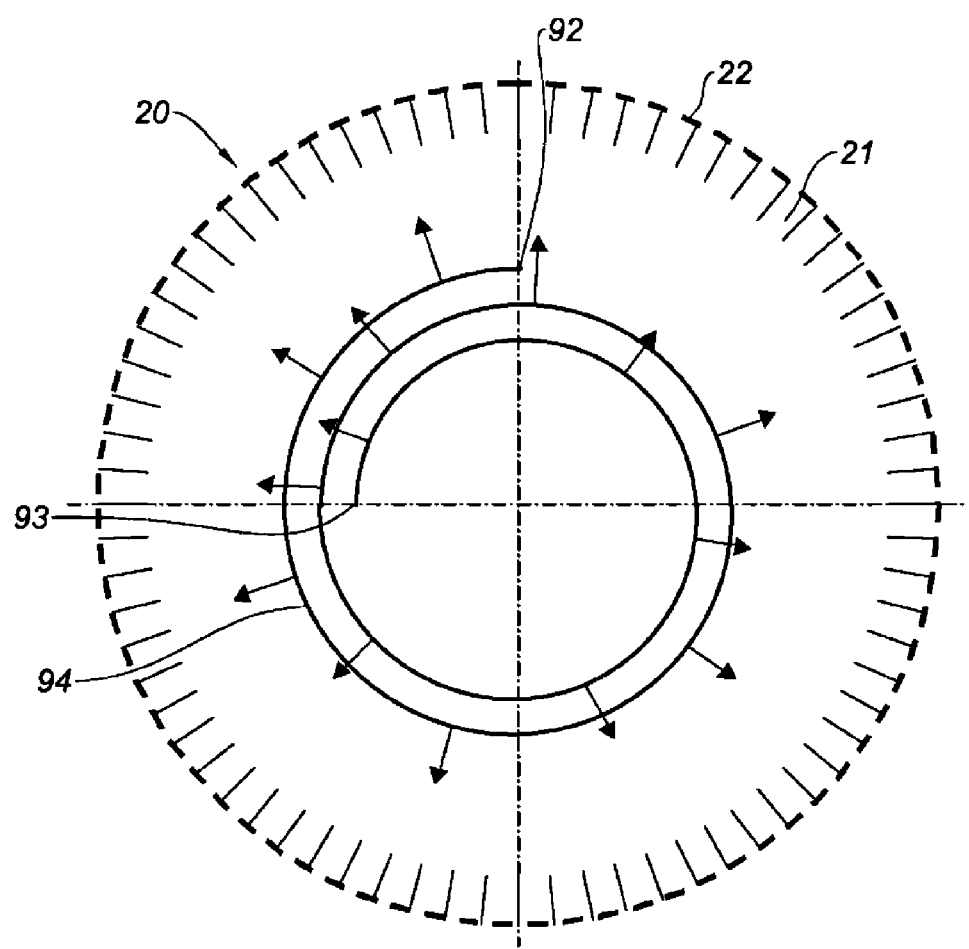

According to another preferred embodiment illustrated in FIG. 9, the elastic means are produced by the internal skin 23 having a spiral spring function 94 able to exert pressure against the acoustic structure 21 so as to put said structure 21 in contact with the external skin 22. The advantage of such a configuration is to obtain a contact stress that is uniformly distributed over the entire periphery of the acoustic panel 20 of the invention.

The contact between the acoustic structure 21 and the spiral spring 94 can be done by simple contact or by gluing or by any other means known by those skilled in the art making it possible to fasten the spiral spring 94 on the acoustic structure 21.

The spiral spring 94 is made of a suitable material known by those skilled in the art. Examples include CMC, titanium or inconel.

Advantageously, the circumference of the internal skin in spiral spring 94, once unfolded, has a larger radius than that of the circumference of the acoustic structure 21 so as to obtain an optimal pressure on said acoustic structure 21.

The compressed spiral spring 94 (see FIG. 9) is positioned inside the external shroud formed by the external skin 22 mounted on the acoustic structure 21. The spiral spring 94 is then released so as to press itself against the internal face of the acoustic structure 21. The spiral spring 94 then fulfills the role of the internal skin.

Once unfolded, the spiral spring 94 may have separating set between its two ends 92 or 93 or an overlap between said ends. The two ends 92 and 93 can also be spliced.

The spiral spring 94 can be adapted as a function of the lines on which it rests. For example, the spiral spring 94 may be made completely or partially along a longitudinal direction of the panel 20 of the invention.

The panel of the invention may include both elastic means and mechanical fastening means, alone or in combination.

The invention claimed is:

1. An acoustic panel for an ejection nozzle comprising:
    an external skin containing acoustic holes,
    an internal skin,
    an acoustic structure comprising alveolar-core cells between the internal skin and the external skin,
    wherein at least one main component selected from the external skin, the internal skin and the acoustic structure is formed by a composite material and the acoustic structure is held in contact on at least one of the internal and external skins by compression using elastic means selected from the group consisting of a fibrous assembly, dampers and a spiral spring.

2. The panel according to claim 1, wherein at least one part of the elastic means comprises at least one fibrous assembly topping the acoustic structure and able to compress in thickness.

3. The panel according to claim 2, wherein the fibrous assembly is formed by a material comprising at least one of a high-temperature graphite and carbon felts integrating at least one of a porosity of the felt, a tortuosity of the fibers, an aspect ratio, an average size of the fibers, and an entanglement rate.

4. The panel according to claim 1, wherein at least a part of the elastic means comprises dampers extending the wall of at least one part of the alveolarcore cells of the acoustic structure.

5. The panel according to claim 4, wherein the dampers are in the form of curved tongues.

6. The panel according to claim 4, wherein at least one damper is attached on the wall.

7. The panel according to claim 4, wherein at least one damper and the wall are formed in a single piece.

8. The panel according to claim 1, wherein the elastic means comprises a spiral spring able to exert pressure against the acoustic structure so as to put said structure and the external skin in contact.

9. The panel according to claim 1, further comprising a mechanical means to fasten the acoustic structure on at least one of the internal and external skins.

10. The panel according to claim 9, wherein the mechanical fastening means comprise rivets fastening a plurality of closed alveolar-core cells to one end and one of the internal and external skins.

11. The panel according to claim 9, wherein at least a part of the mechanical fastening means connects a spacer of the internal and external skins.

12. The panel according to claim 9, wherein a part of the mechanical fastening means comprises glue or solder deposits applied between the acoustic structure and at least one of the internal and external skins.

13. The panel according to claim 12, having a set between the acoustic structure and one of the internal and external skins.

14. The panel according to claim 1, wherein the composite material bears a temperature at least equal to about 500° C.

15. The panel according to claim 14, wherein the composite material is a ceramic matrix composite material.

16. An ejection nozzle for a nacelle comprising an acoustic panel according to claim 1.

17. A nacelle comprising an ejection nozzle according to claim 16.

* * * * *